United States Patent [19]

Okazaki

[11] Patent Number: 5,099,358
[45] Date of Patent: Mar. 24, 1992

[54] APPARATUS FOR RECORDING IMAGE INCLUDING AN AFOCAL OPTICAL SYSTEM

[75] Inventor: Masahide Okazaki, Kyoto, Japan

[73] Assignee: Dainippon Screen Mfg. Co., Ltd., Japan

[21] Appl. No.: 462,819

[22] Filed: Jan. 10, 1990

[30] Foreign Application Priority Data

Jan. 13, 1989 [JP] Japan .................................. 1-7035

[51] Int. Cl.⁵ .................... G02B 27/00; G02B 27/10
[52] U.S. Cl. .................................. 359/503; 359/434; 359/618
[58] Field of Search .............. 350/574, 572, 570, 453, 350/415, 423–427, 6.1, 6.5–6.8, 501, 169, 171; 346/108, 160; 354/4

[56] References Cited

U.S. PATENT DOCUMENTS

| | | | |
|---|---|---|---|
| 3,464,740 | 9/1969 | Laures | 350/453 |
| 4,253,735 | 3/1981 | Kawamura et al. | 350/6.5 |
| 4,312,588 | 1/1982 | Mihoura et al. | 350/6.6 |
| 4,318,594 | 3/1982 | Hanada et al. | 350/453 |
| 4,398,787 | 8/1983 | Balasubramanian | 350/6.4 |
| 4,412,720 | 11/1983 | Costa | 350/96.18 |
| 4,556,290 | 12/1985 | Roulet | 350/453 |
| 4,592,625 | 6/1986 | Uehara et al. | 350/415 |
| 4,621,890 | 11/1986 | Suzuki et al. | 350/453 |
| 4,643,516 | 2/1987 | Ogura | 350/6.8 |
| 4,669,883 | 6/1987 | Ina et al. | 356/400 |
| 4,797,696 | 1/1989 | Allen et al. | 350/171 |

FOREIGN PATENT DOCUMENTS

| | | | |
|---|---|---|---|
| 52-118302 | 10/1977 | Japan . | |
| 52-123701 | 10/1977 | Japan . | |
| 60-169820 | 9/1985 | Japan . | |
| 60-172022 | 9/1985 | Japan . | |
| 32615 | 2/1987 | Japan | 350/415 |

Primary Examiner—Jon W. Henry
Attorney, Agent, or Firm—Ostrolenk, Faber, Gerb & Soffen

[57] ABSTRACT

Laser beams corresponding to an image are directed through an afocal optical system such that chief rays of the laser beams outgoing from the system are substantially perpendicular to a recording surface and such that beam waists of the laser beams are approximately located at the recording surface. Thus, the image can be recorded on the recording surface with high picture quality.

3 Claims, 12 Drawing Sheets

(=BEAM WAIST)

FIG. 14

APPARATUS FOR RECORDING IMAGE INCLUDING AN AFOCAL OPTICAL SYSTEM

BACKGROUND OF THE INVENTION

1. Field of the Invention

The present invention relates to an apparatus, such as a laser plotter or a graphic arts color scanner, for recording an image. In particular, the present invention relates to an image recorder which scans an image recording surface with a plurality of parallel recording beams.

2. Description of the Prior Art

Figure 1:
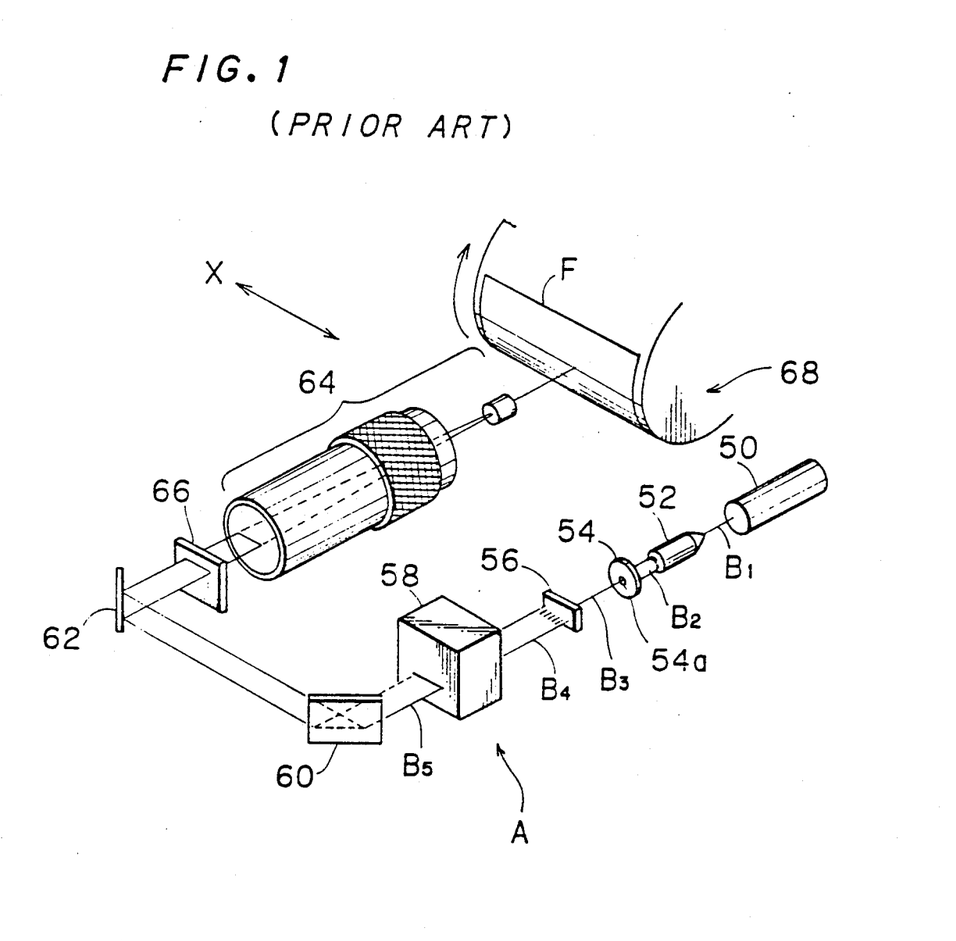
FIG. 1 is a perspective view of a conventional image recorder.

FIG. 1 is a perspective view showing a conventional laser plotter or graphic arts color scanner. The image recorder includes a recording head A and a driving unit (not shown) for moving the recording head A in the X-direction.

In operation, the laser beam $B_1$ from a light source 50 enters a beam expander 52, its diameter is expanded, and the expanded laser beam $B_2$ is projected onto a stop 54 having an aperture 54a. A central portion $B_3$ of the expanded laser beam $B_2$ is projected through the aperture 54a. The aperture 54a sharpens the edges of the image to be formed.

The laser beam $B_3$ which passes through the stop 54 is divided into a plurality of laser beams $B_4$ by a beam splitter 56. The laser beams $B_4$ are individually modulated by an optical modulator system 58 in response to image signals.

A multibeam $B_5$ from the optical modulator system 58 is reflected by reflecting mirrors 60 and 62, and then projected through a slit plate 66 toward a telecentric lens system 64 and toward a photosensitive material F which is wound on a rotating cylinder 68. Thus, the image is recorded on the photosensitive material F. The laser beams $B_5$ are focused by the lens system 64 onto the photosensitive material F. Therefore, the conventional image recorder is advantageous in that the size of the image is not varied even if the distance between the rotating cylinder 68 and the recording head A is changed.

However, since only the central portion of the expanded laser beam $B_2$ passes through the aperture 54a and since the extracted laser beam $B_3$ is divided into a plurality of laser beams by the beam splitter 56, a high power light source 50 has generally been needed to be sure that the beams $B_4$ are sufficiently intense. But this increases the size of the image recorder. This problem is also present when the light source is formed by laser diodes or the like.

SUMMARY OF THE INVENTION

It is an object of the present invention to provide an image recorder which can record an image on a recording surface with high picture quality.

Another object of the present invention is to reduce the size of the apparatus.

The present invention relates to an apparatus for recording an image on a recording surface, which includes: a light source for generating a plurality of recording laser beams; a modulator for individually modulating the laser beams in response to image signals which are representative of an image; and an afocal optical system for directing the laser beams toward a recording surface such that chief rays of each of the laser beams are substantially perpendicular to the recording surface at the recording surface and such that first beam waists of the laser beams are located approximately at the recording surface.

These and other objects, features and aspects of the present invention will become more apparent from the following detailed description of the present invention when taken in conjunction with the accompanying drawings.

DETAILED DESCRIPTION OF THE PREFERRED EMBODIMENTS

A. Principle of the Invention

Figure 2:
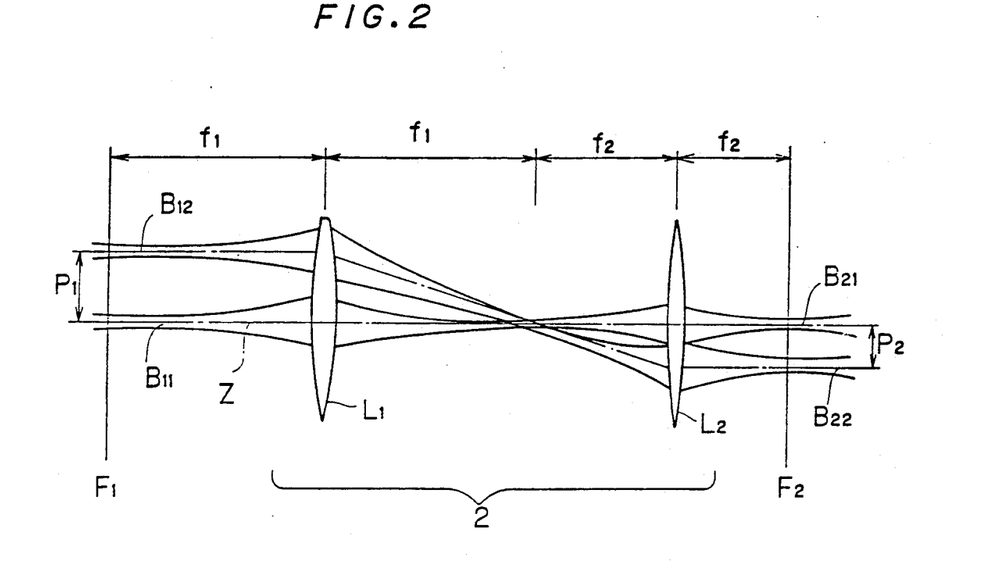
FIGS. 2 and 3 are schematic diagrams of an optical system which is formed by an afocal optical system.

Referring to FIG. 2, an afocal optical system 2 comprises two convex lenses (an objective lens $L_1$ and an eyepiece lens $L_2$) which are spaced apart from each other by the sum of their focal lengths, i.e., $f_1 + f_2$.

It is known from Kogaku Gijutsu Contact, Vol. 22, No. 7, 1984, Kogaku Kogyo Gijutsu Kyokai, p. 61, for example, that: (1) when a beam waist $W_1$ of a laser beam $B_{11}$ is set at the front focal point $F_1$ of the objective lens $L_1$, a beam waist $W_2$ of a laser beam $B_{21}$ is formed at the back focal point $F_2$ of the eyepiece lens $L_2$ and (2) the radii $\omega_1$ and $\omega_2$ of the laser beams $B_{11}$ and $B_{21}$ at the beam waists $W_1$ and $W_2$ satisfy the following relationship:

$$\omega_2 = \frac{f_2}{f_1} \cdot \omega_1 = m \cdot \omega_1 \qquad (1)$$

where m is the magnification of the system 2.

The term "beam waist" refers to the point where the width of a laser beam is narrowed to the minimum. The radius of curvature of a wave front is infinite at the beam waist.

Noting only the chief ray of a laser beam, it is known that a laser beam propagates according to the theories of geometric optics. Therefore, when parallel laser beams $B_{11}$ and $B_{12}$ having a beam pitch $P_1$ are projected onto the objective lens $L_1$, parallel laser beams $B_{21}$ and $B_{22}$ having a beam pitch $P_2$ outgo from the eyepiece lens $L_2$. The relationship between $P_1$ and $P_2$ is as follows:

$$P_2 = \frac{f_2}{f_1} \cdot P_1 = m \cdot P_1 \tag{2}$$

It is understood from equations (1) and (2) that the radii of the beams $B_{21}$ and $B_{22}$ at the beam waists and the pitch of parallel laser beams passing through the afocal optical system 2 are proportional to the magnification m ($=f_2/f_1$) of the system 2.

Figure 3:
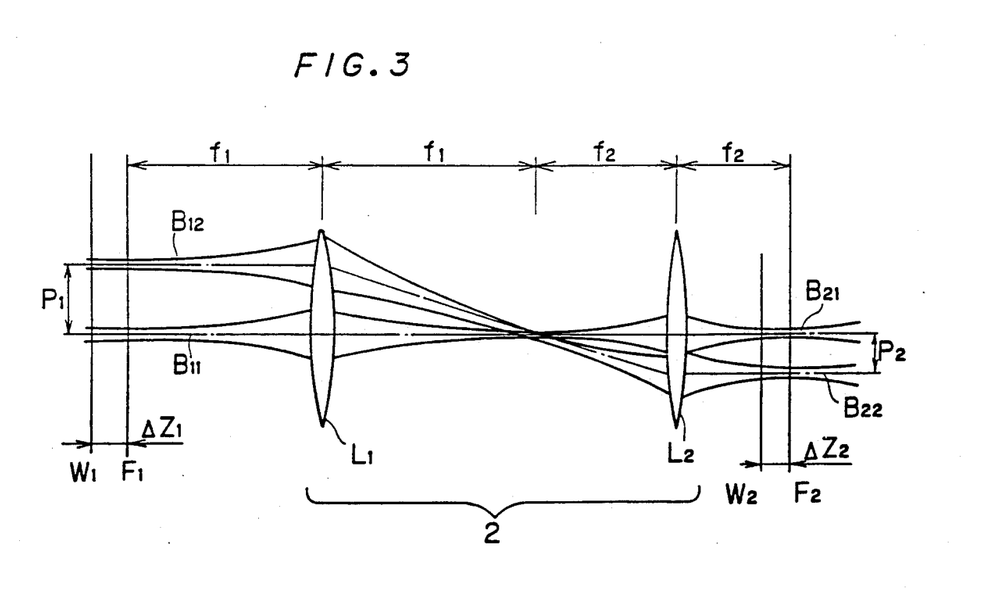
Figure 4A:
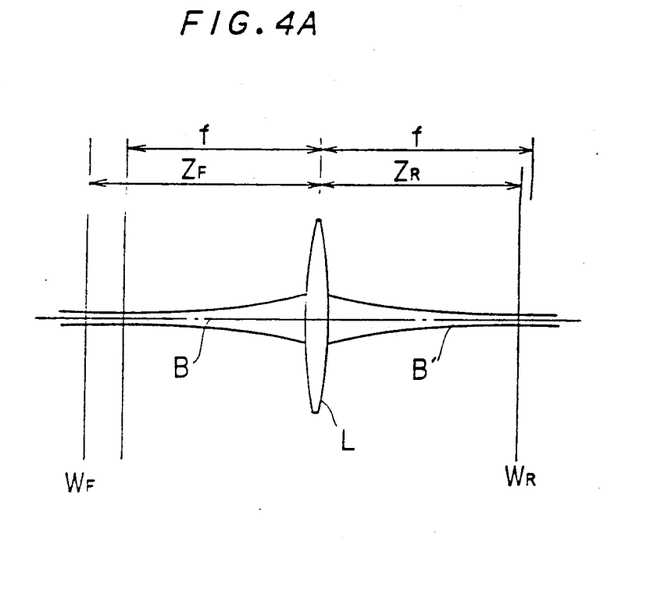
FIG. 4A illustrates the relationship between a beam waist of a laser beam which is incident upon a lens and a beam waist of a laser beam passing through the lens.

In FIG. 3, the beam waists of the laser beams $B_{11}$ and $B_{12}$ are not set at the front focal point $F_1$ of the objective lens $L_1$. Instead, the beam waists are set at a point $W_1$. Symbol $\Delta Z_1$ represents the distance between the front focal point $F_1$ and the beam waist $W_1$. Symbol $\Delta Z_2$ represents the distance between the back focal point $F_2$ of the eyepiece lens $L_2$ and the beam waist $W_2$ of the laser beams $B_{21}$ and $B_{22}$. The absolute values of the distances $\Delta Z_1$ and $\Delta Z_2$ are proportional to the square of the magnification m. The reason for this is explained in connection with FIGS. 4A and 4B as follows:

When a laser beam B ($TEM_{00}$ mode beam) being in Gaussian distribution is converged by a lens L having a focal length f, the optical system shown in FIG. 4A satisfies the following relationship:

$$Z_R = f + \frac{(Z_F - f)f^2}{(Z_F - f)^2 + (\pi \omega_F^2/\lambda)^2} \tag{3}$$

$$\frac{1}{\omega_R^2} = \frac{1}{\omega_F^2}\left(1 - \frac{Z_F}{f}\right)^2 + \frac{1}{f^2}\left(\frac{\pi \omega_F}{\lambda}\right)^2 \tag{4}$$

where symbol $Z_F$ represents the distance between a beam waist $W_F$ of an incident laser beam B and the lens L, symbol $Z_R$ represents the distance between the lens L and a beam waist $W_R$ of a laser beam B' outgoing from the lens L, symbols $\omega_F$ and $\omega_R$ represent beam radii at the beam waists $W_F$ and $W_R$, respectively, and symbol $\lambda$ represents the wavelength of the laser beam B (B').

Figure 4B:
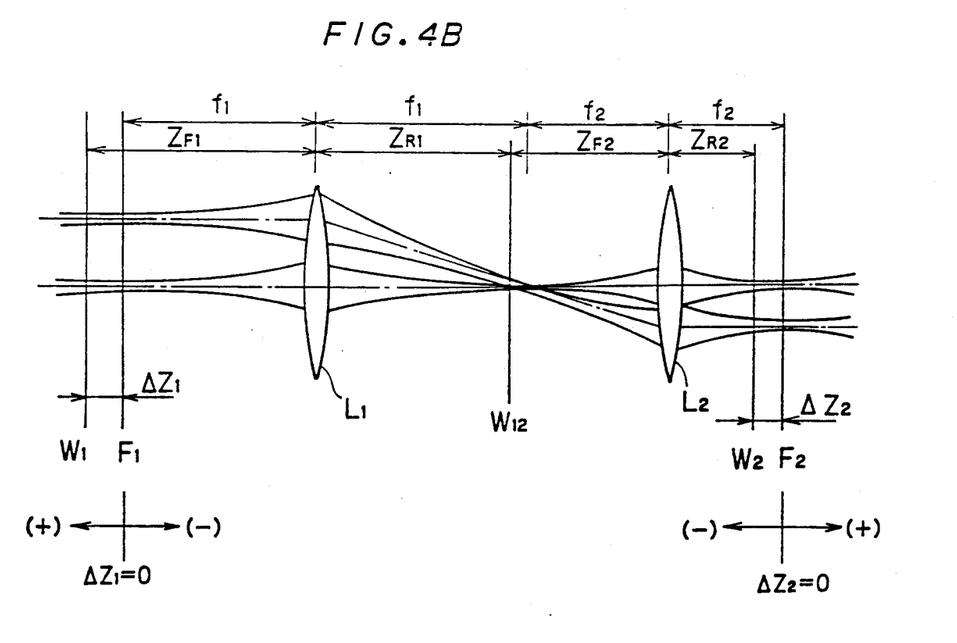
FIG. 4B illustrates the relationship between a beam waist of a laser beam which is incident upon the optical system shown in FIG. 3 and a beam waist of a laser beam passing through the optical system.

As shown in FIG. 4B, therefore, the objective lens $L_1$ of the afocal optical system 2 satisfies the following relationship:

$$Z_{R1} = f_1 + \frac{(Z_{F1} - f_1)f_1^2}{(Z_{F1} - f_1)^2 + (\pi \omega_{F1}^2/\lambda)^2} \tag{5}$$

$$\frac{1}{\omega_{R1}^2} = \frac{1}{\omega_{F1}^2}\left(1 - \frac{Z_{F1}}{f_1}\right)^2 + \frac{1}{f_1^2}\left(\frac{\pi \omega_{F1}}{\lambda}\right)^2 \tag{6}$$

where symbol $Z_{F1}$ represents the distance between the beam waist $W_1$ and the objective lens $L_1$, symbol $Z_{R1}$ represents the distance between the objective lens $L_1$ and a beam waist $W_{12}$ of a laser beam outgoing from the lens $L_1$, and symbol $\omega_{F1}$ represents a beam radius ($=\omega_1$) at the beam waist $W_1$.

Similarly, the eyepiece lens $L_2$ of the afocal optical system 2 satisfies the following relationships:

$$Z_{R2} = f_2 + \frac{(Z_{F2} - f_2)f_2^2}{(Z_{F2} - f_2)^2 + (\pi \omega_{F2}^2/\lambda)^2} \tag{7}$$

$$\frac{1}{\omega_{R2}^2} = \frac{1}{\omega_{F2}^2}\left(1 - \frac{Z_{F2}}{f_2}\right)^2 + \frac{1}{f_2^2}\left(\frac{\pi \omega_{F2}}{\lambda}\right)^2 \tag{8}$$

where symbol $Z_{F2}$ represents the distance between the beam waist $W_{12}$ and the eyepiece lens $L_2$, symbol $Z_{R2}$ represents the distance between the eyepiece lens $L_2$ and the beam waist $W_2$ of the laser beam outgoing from the lens $L_2$, and symbol $\omega_{F2}$ represents a beam radius ($=\omega_2$) at the beam waist $W_2$.

From FIG. 4B, assuming distances $\Delta Z_1$ and $\Delta Z_2$ are negative when the beam waists $W_1$ and $W_2$ are closer to the lenses $L_1$ and $L_2$, respectively, the relationship between the distances $Z_{F1}$, $Z_{R2}$ and the focal lengths $f_1$, $f_2$ are as follows:

$$Z_{F1} = f_1 + \Delta Z_1 \qquad \ldots (9)$$

$$Z_{R2} = f_2 + \Delta Z_2 \qquad \ldots (10)$$

Since the optical system 2 is an afocal system, the optical system 2 satisfies the following relationship:

$$Z_{R1} + Z_{F2} = f_1 + f_2 \qquad \ldots (11)$$

It then follows from equations (5) to (11) that the relationship between the distance $\Delta Z_1$ and the distance $\Delta Z_2$ is as follows:

$$\Delta Z_2 = -\left(\frac{f_2}{f_1}\right)^2 \Delta Z_1 = -m^2 \cdot \Delta Z_1 \tag{12'}$$

Different coordinate systems are utilized in equation (12') for the front and rear focal sides of the afocal system for calculating an absolute value (see FIG. 4B).

With measurement in a common coordinate system, the relationship between the distances $\Delta Z_1$ and $\Delta Z_2$ is as follows:

$$\Delta Z_2 = \left(\frac{f_2}{f_1}\right)^2 \cdot \Delta Z_1 = m^2 \cdot \Delta Z_1 \tag{12}$$

It is appreciated from the equation (12) that the distances $\Delta Z_1$ and $\Delta Z_2$ are proportional to the square of the magnification m of the afocal optical system 2.

Also, a beam pitch $P_2$ of the laser beams $B_{21}$ and $B_{22}$ and a beam radius $\omega_2$ at the beam waist $W_2$ are obtained from the equations (5) and (11) and expressed by the above equations (1) and (2), respectively. Thus, it is noted that the beam pitch $P_2$ and the beam radius $\omega_2$ are not functionally related to the distances $\Delta Z_1$ and $\Delta Z_2$.

Thus, when a recording surface is located at the beam waist $W_2$, recording can be made by laser beams whose beam radii correspond to the beam radius $\omega_2$.

Figure 5:
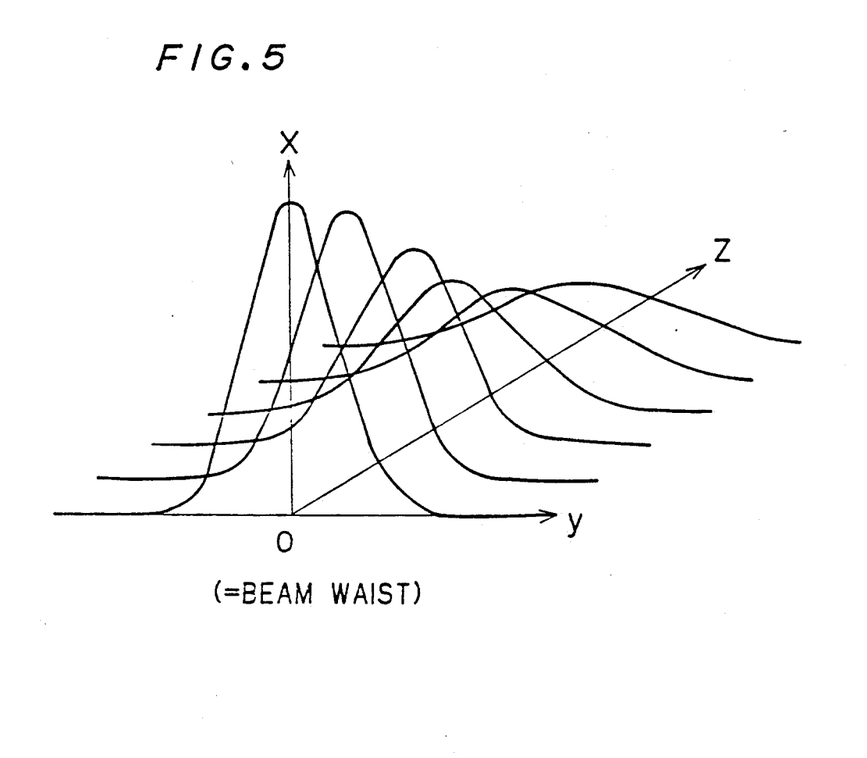
FIG. 5 illustrates the distribution of the intensity of a laser beam around a beam waist.

FIG. 5 illustrates the distribution of the intensity of a laser beam around a beam waist. In this figure, light intensity is measured along the X-axis, beam diameter is measured along the Y-axis, and the distance from the beam waist is measured along the Z-axis. As is apparent from FIG. 5, by locating the recording surface at the beam waist, it is possible to record a sharp image on the surface.

Figure 6:
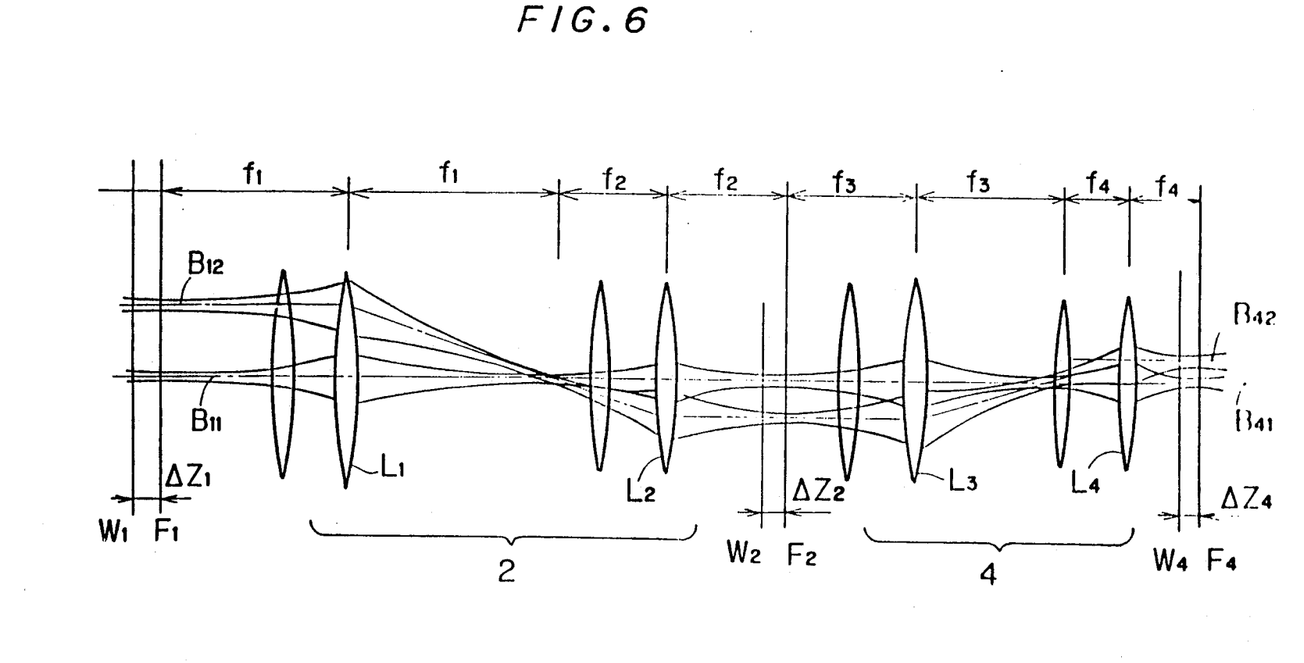
FIGS. 6 and 7 are schematic diagrams of an optical system which is formed by two afocal optical systems.

FIG. 6 illustrates an optical system which is provided with the afocal optical system 2 and another afocal optical system 4. The system 4 includes two convex lens $L_3$ and $L_4$ which are spaced apart from each other by the sum of their focal lengths, i.e., $f_3+f_4$. The distance between the lens $L_2$ and the lens $L_3$ is equal to $f_2+f_3$.

Assuming that symbol $\Delta Z_4$ represents the distance between a beam waist $W_4$ of laser beams $B_{41}$ and $B_{42}$ outgoing from the eyepiece lens $L_4$ and a back focal point $F_4$ of the eyepiece lens $L_4$, the relationship between the distance $\Delta Z_4$ and the distance $\Delta Z_1$ is as follows:

$$\Delta Z_4 = \left(\frac{f_2 \cdot f_4}{f_1 \cdot f_3}\right)^2 \cdot \Delta Z_1 \quad (13)$$

Similarly, the relationship between a beam pitch $P_1$ of the laser beams $B_{11}$ and $B_{12}$ and a beam pitch $P_4$ of the laser beams $B_{41}$ and $B_{42}$ is as follows:

$$P_4 = \left(\frac{f_2 \cdot f_4}{f_1 \cdot f_3}\right) \cdot P_1 \quad (14)$$

Further, the relationship between a beam radius $\omega_1$ of the laser beams $B_{11}$ and $B_{12}$ at the beam waist $W_1$ and a beam radius $\omega_4$ of the laser beams $B_{41}$ and $B_{42}$ at the beam waist $W_4$ is as follows:

$$\omega_4 = \left(\frac{f_2 \cdot f_4}{f_1 \cdot f_3}\right) \cdot \omega_1 \quad (15)$$

Figure 7:
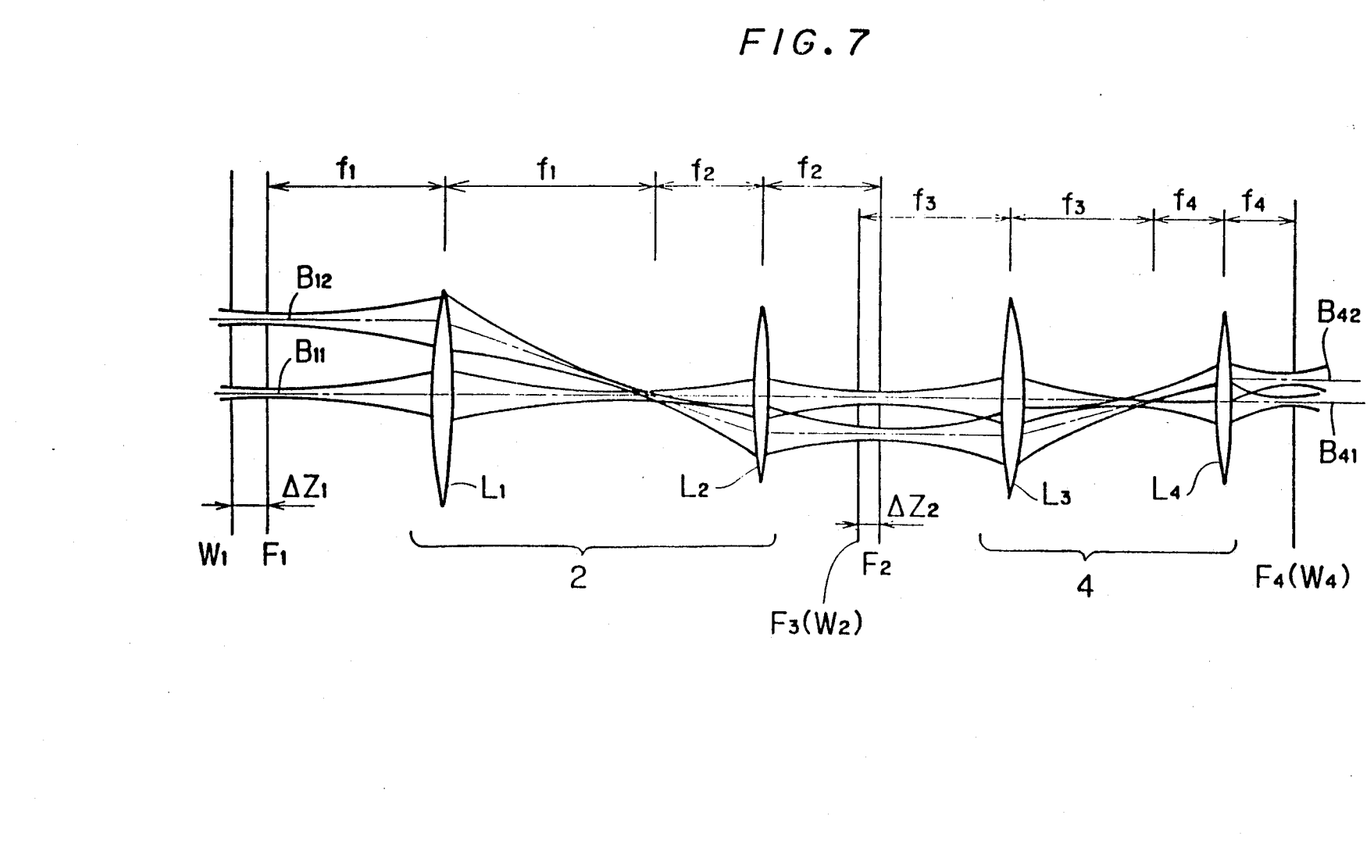

FIG. 7 shows another optical system in which the beam waist $W_2$ of the laser beams outgoing from the afocal optical system 2 coincides with the front focal point $F_3$ of the objective lens $L_3$ of the afocal optical system 4, i.e., the distance between the lenses $L_2$ and $L_3$ is $f_2+f_3-\Delta Z_2$.

In the optical system shown in FIG. 7, the beam waist $W_4$ of the laser beams $B_{41}$ and $B_{42}$ outgoing from the eyepiece lens $L_4$ coincides with the back focal point $F_4$ of the eyepiece lens $L_4$ since (as in FIG. 2) the front focal point $F_3$ of the objective lens $L_3$ coincides with the beam waist $W_2$ of the incident laser beams. The beam pitch $P_4$ of the laser beams $B_{41}$ and $B_{42}$ and the beam radius $\omega_4$ of the laser beams $B_{41}$ and $B_{42}$ at the beam waists thereof are determined by equations (14) and (15), respectively.

A sharp image can be obtained by arranging a recording surface at the beam waist $W_4$ of the laser beams $B_{41}$ and $B_{42}$ outgoing from the optical systems shown in either FIG. 6 or FIG. 7.

Since the optical systems of FIGS. 6 and 7 are formed of two afocal optical systems 2 and 4, magnification may be controlled by flexibly structuring the afocal optical systems 2 and 4 while aberration can be decreased as compared with the single-stage optical system shown in FIGS. 2 and 3.

Figure 8:
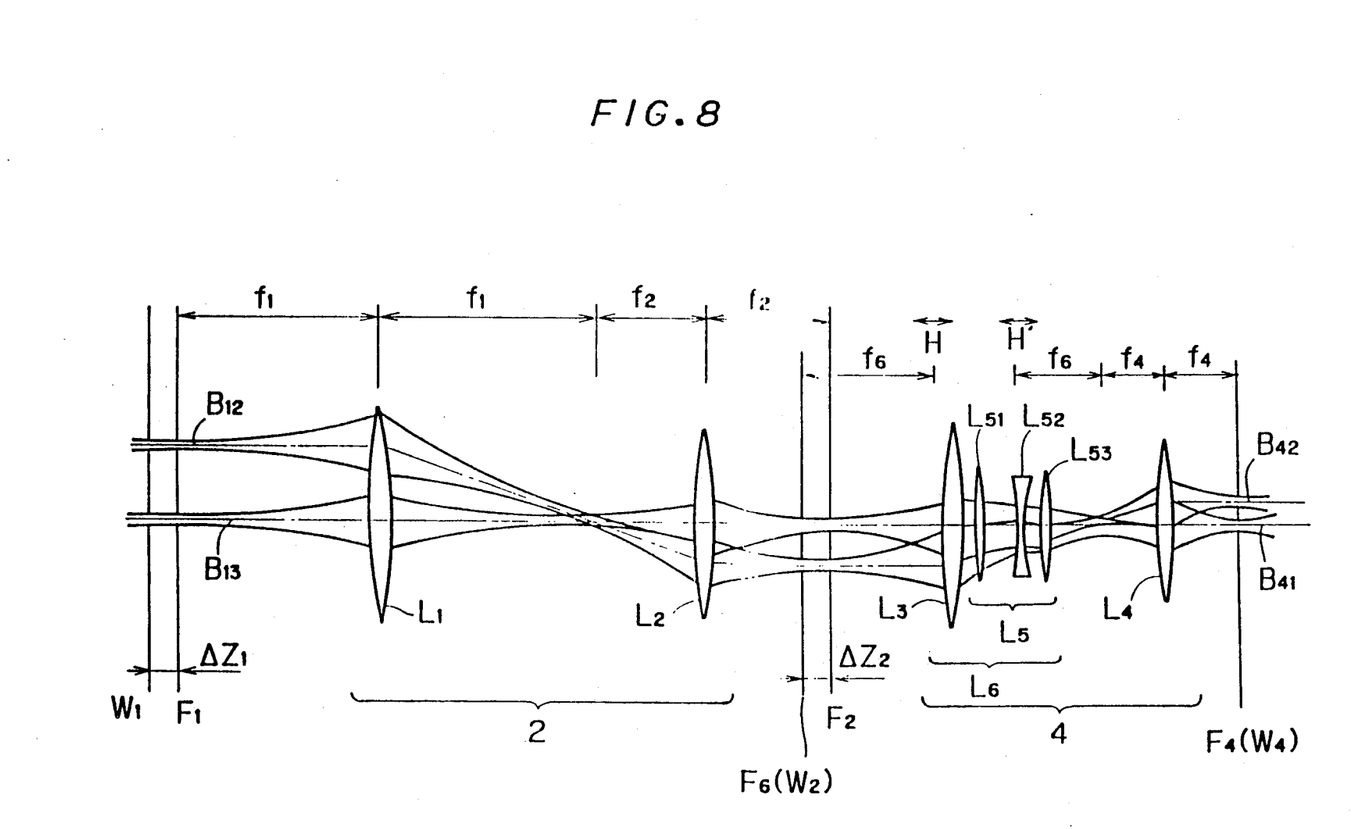
FIG. 8 is a schematic diagram of an optical system which includes a zoom system.

FIG. 8 shows an optical system which includes a zoom system $L_5$. The system illustrated in FIG. 8 is otherwise similar to the system illustrated in FIG. 7. The zoom system $L_5$ includes two convex lenses $L_{51}$ and $L_{53}$ and a concave lens $L_{52}$. The zoom system $L_5$ is disposed between the lenses $L_3$ and $L_4$. The lens $L_3$ and the zoom system $L_5$ form a combined lens system $L_6$ with a focal length $f_6$.

The front focal point $F_6$ of the lens system $L_6$ coincides with the beam waist $W_2$. Symbols H and H' represent front and rear principal points of the lens system $L_6$, respectively. The focal length $f_6$ changes according to the movement of the lenses $L_{51}$ through $L_{53}$ and the front and back principal points H and H' move by the same distance in a contrary direction so that the front and back focal points of the lens system $L_6$ do not move. Thus, the beam waist $W_4$ does not move when the magnification of the zoom system $L_5$ is changed by moving the lenses $L_{51}$ to $L_{53}$.

On the other hand, the pitch of the laser beams $B_{41}$ and $B_{42}$ and the beam radius at the beam waist $W_4$ are proportional to the magnification of the system.

Thus, a sharp image can be obtained in any magnification by arranging a recording surface at the beam waist $W_4$ and moving the lenses $L_{51}$ through $L_{53}$.

From the foregoing, the following observations can be made:

First, the light density of a laser beam is highest at its beam waist, and the beam waist of a laser beam outgoing from the optical system shown in each of FIGS. 2, 3, 4, 6, 7 and 8 can be determined. Thus, a recording surface can be easily located at the beam waist such that a sharp image can be recorded.

Further, parallel outgoing laser beams are generated when parallel laser beams enter the optical systems described above. The parallel outgoing laser beams are substantially vertical with respect to the recording surface. Therefore, the size of the image formed on the surface does not vary when the distance between the surface and the optical system is changed slightly.

Figure 9:
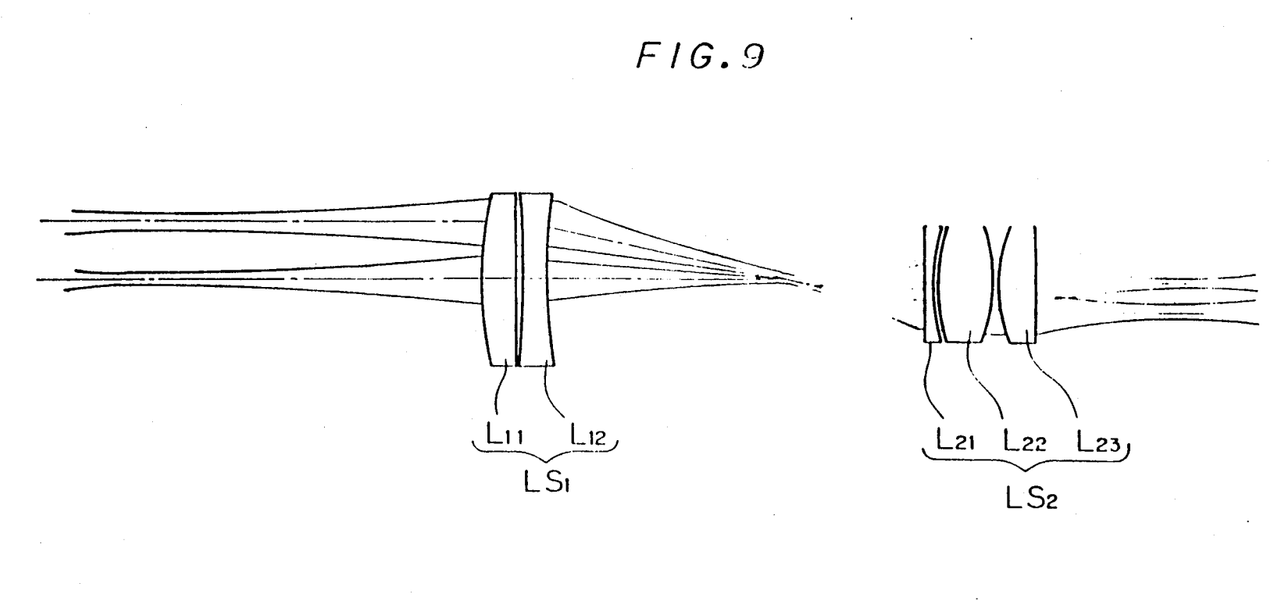
FIG. 9 is a schematic diagram of an afocal optical system which is formed by an objective lens system having two lenses and an eyepiece lens system having three lenses.

The present invention is not limited to the optical systems described. An afocal system formed by an objective lens system having two lens $L_{11}$ and $L_{12}$ and an eyepiece lens system having three lens $L_{21}$, $L_{22}$ and $L_{23}$, as shown in FIG. 9, may be used. In general, the objective lens system and the eyepiece lens system are formed by a plurality of lenses to correct aberration.

B. First Embodiment

Figure 10:
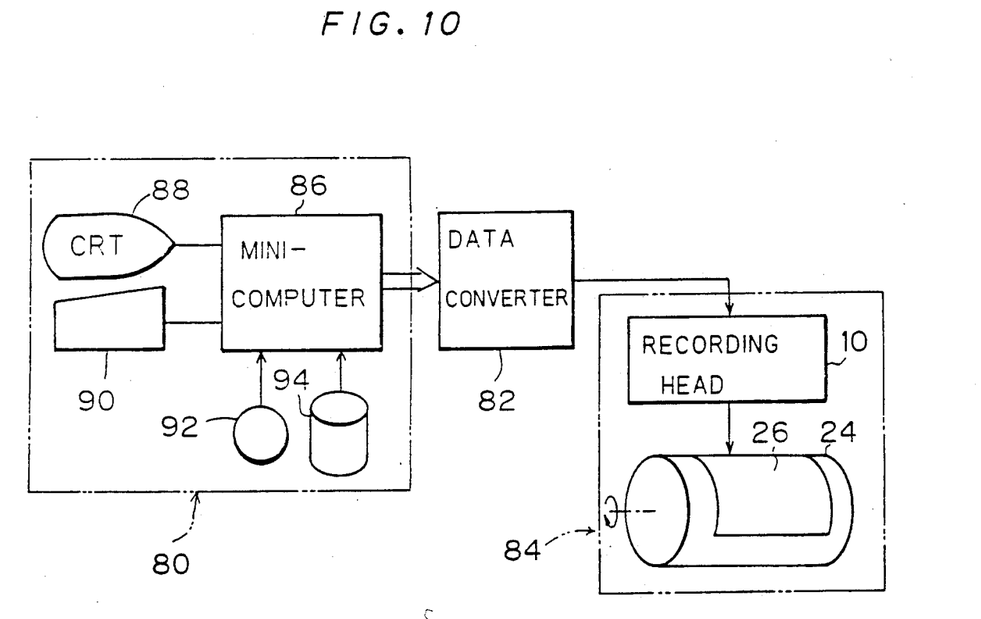
FIG. 10 is a block diagram of an image recorder according to the present invention.

FIG. 10 is a block diagram of a laser plotter which includes an image data processor 80, a data converter 82 and an image recorder 84.

The image data processor 80 includes a minicomputer 86 for calculating vector data of an image to be recorded, a CRT 88, a keyboard 90, a magnetic tape unit 92 and a magnetic disk unit 94 for storing CAD data. The vector data is obtained from the CAD data.

The data converter 82 converts the vector data into dot data. The image recorder 84 records the image on photosensitive material 26 which is wound on a rotating cylinder 24. The recording is controlled by the dot data from the data converter 82. The image recorder 84 includes a recording head 10 and a driving unit (not shown) coupled to the recording head 10 for moving the same in the X-direction.

Figure 11:
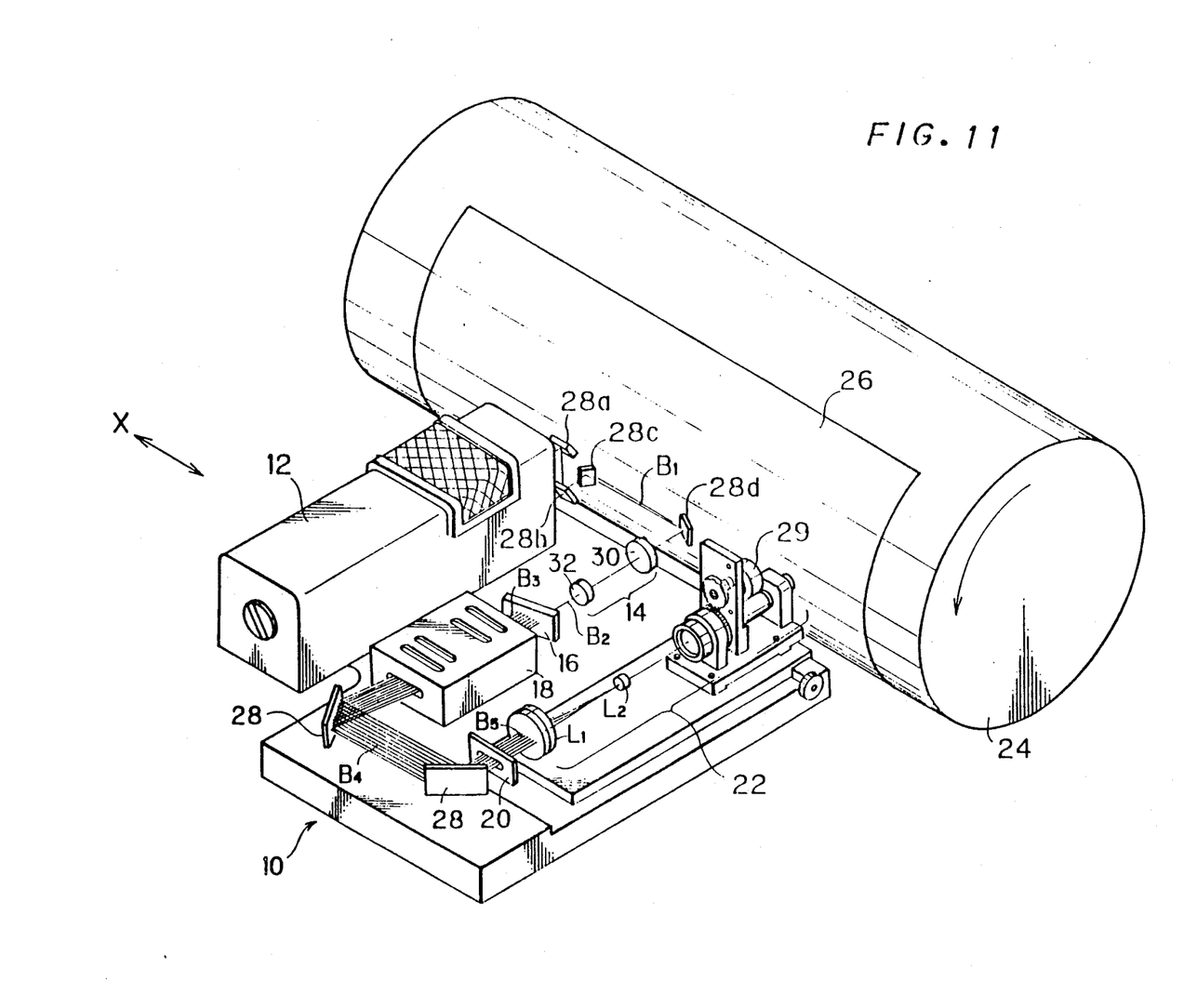
FIG. 11 is a perspective view of a recording head of an image recorder according to a first preferred embodiment of the present invention.

Referring to FIG. 11, the recording head 10 comprises a laser beam source 12, a beam diameter converter 14, a beam splitter (dividing means) 16, a multi-channel optical modulator 18, a slit plate 20, mirrors 28a to 28d, an optical system 22 (structured as shown in FIG. 8) and a stepping motor 29 for moving the zoom lenses of the optical system 22.

In operation, a laser beam $B_1$ from the source 12 enters the beam diameter converter 14 through four mirrors 28a to 28d.

Figure 12:
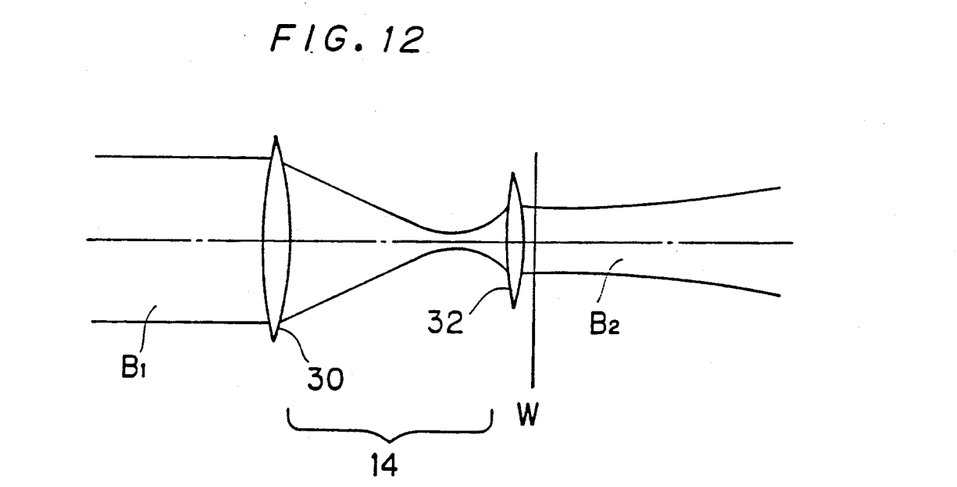
FIG. 12 illustrates a beam diameter converter.

Referring to FIG. 12, the beam diameter converter 14 comprises two convex lenses 30 and 32. The distance between the lenses 30 and 32 is such that a beam waist W of the reduced diameter laser beam $B_2$ is immediately in front of the lens 32. The beam diameter converter 14 is provided between the laser beam source 12 and the beam splitter 16 for the following reason:

The optical system 22 includes the zoom system illustrated in FIG. 8 for changing magnification. The zoom system makes it possible to change the diameter of beams outgoing from the system 22. However, when the magnification of the system is changed, the pitch of the beams outgoing from the optical system 22 is also changed. The beam diameter converter 14 makes it possible to set the beam diameter at a prescribed value without changing the beam pitch.

The function of the converter 14 is similar to that of the aperture 54a in that the converter 14 reduces the diameter of the laser beam $B_2$. But unlike the aperture 54a, the converter 14 does not change the distribution of the intensity of the light passing therethrough. That is, the intensity of the beam $B_2$ has a Gaussian distribution across its width.

The converter 14 is not restricted to the Keplerian type shown in FIG. 12. The converter may be a Galileian or Cassegrainian type, or a focal system.

Figure 13:
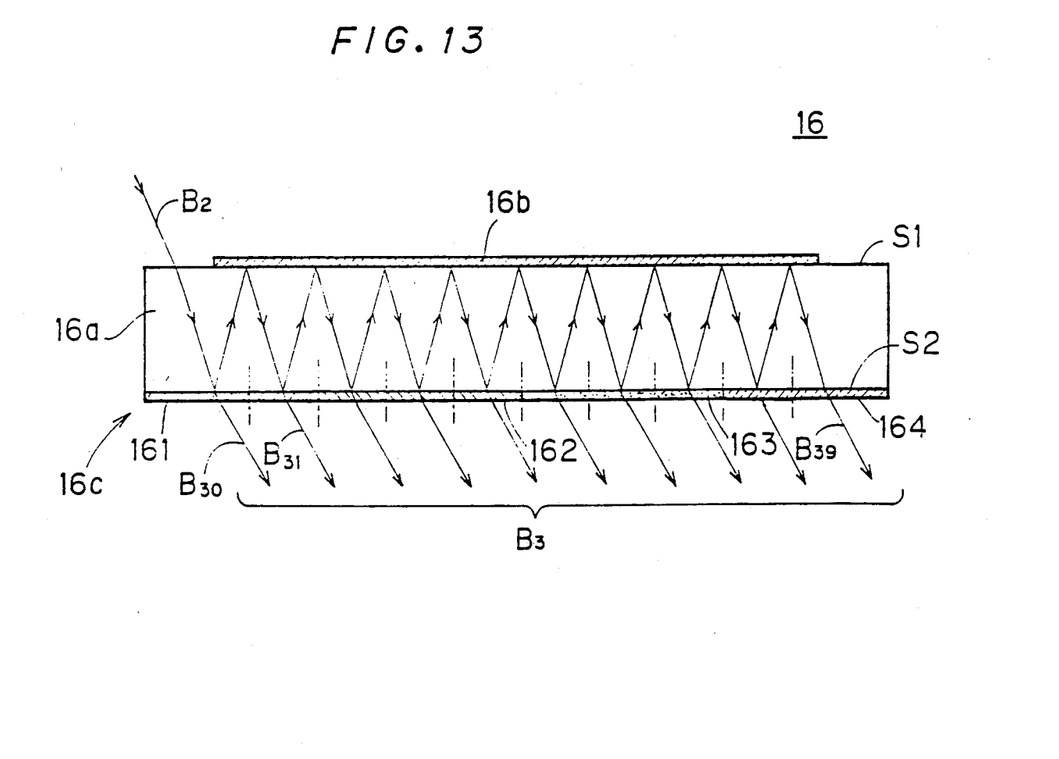
FIG. 13 is a sectional view of a beam splitter.

As shown in FIG. 13, the beam splitter 16 includes a glass plate 16a with a pair of parallel flat surfaces S1, S2. A total reflection film 16b is adhered to the surface S1 and a semi-transparent film 16c is adhered to the surface S2.

An uncovered portion of the surface S1 faces the beam diameter converter 14. The surface S2 is covered entirely by the semi-transparent film 16c. The film 16c includes films 161 to 164 which stepswisely transmit more light and stepwisely reflect less light. Thus, an incident laser beam $B_2$ which enters the glass plate 16a at a slight inclination is internally reflected between the total reflection film 16b and the semi-transparent film 16c, while laser beams $B_{30}$, $B_{31}$, . . . , $B_{39}$ pass through the semitransparent film 16c at regular intervals. Thus, the beam splitter 16 divides the laser beam $B_2$ into a multibeam $B_3$ consisting of ten parallel laser beams $B_{30}$, $B_{31}$, . . . , $B_{39}$ outgoing toward the optical modulator 18.

The optical modulator 18 has an acoustooptic, electro-optic or magneto-optic modulation element (not shown) for each of the beam $B_{30}$, $B_{31}$, . . . , $B_{39}$ so as to individually modulate the beams $B_{30}$, $B_{31}$, . . . , $B_{39}$ in response to image signals. The structure and operation etc. of the optical modulator 18 are well known to those skilled in the art, and hence redundant description is omitted.

The slit plate 20 is adapted to pass only primary diffracted laser beams modulated by the optical modulator 18. The plate 20 shields zero-order diffracted light.

A multibeam $B_5$ extracted from the slit plate 20 enters the optical system 22 (i.e., the system illustrated in FIG. 8). In the optical system 22, the parallel laser beams of multibeam $B_5$ are reduced and then directed toward the photosensitive material 26. The rotating cylinder 24 is located substantially at the rear focal point $F_4$ of the eyepiece lens $L_4$ (FIG. 8), i.e., the beam waist $W_4$ of the laser beams outgoing from the optical system 22, so that a sharp image is recorded on the photosensitive material 26.

The laser beams outgoing from the optical system 22 are substantially perpendicular to the photosensitive material 26 (surface of the cylinder 24). Therefore, the size of the image formed on the material 26 does not vary even if the photosensitive material 26 (or the cylinder 24) moves slightly.

Since the beam from the laser beam source 12 is never restricted by an aperture or the like, a relatively small, low power laser beam source 12 can be used. Accordingly, the size of the image recorder can be reduced.

The beam splitter causes the laser beams $B_{30}$, $B_{31}$, . . . , $B_{39}$ to have slightly different optical lengths. Hence, the beams $B_{30}$, $B_{31}$, . . . , $B_{39}$ have slightly different optical beam waists. However, since the beam waists of the laser beams being converged by the optical system 22 are proportional to the square of the magnification m of the optical system 22 (about 1/100 to 1/300), the differences between the beam waists are so small as to be negligible.

In an alternative embodiment, the laser beam $B_1$ may enter the beam splitter 16 without first being reduced.

The optical system 22 may be formed as shown in FIGS. 2, 3, 6, 7 or 8. The optical system may also be formed by three or more afocal optical systems.

B. Second Embodiment

Figure 14:
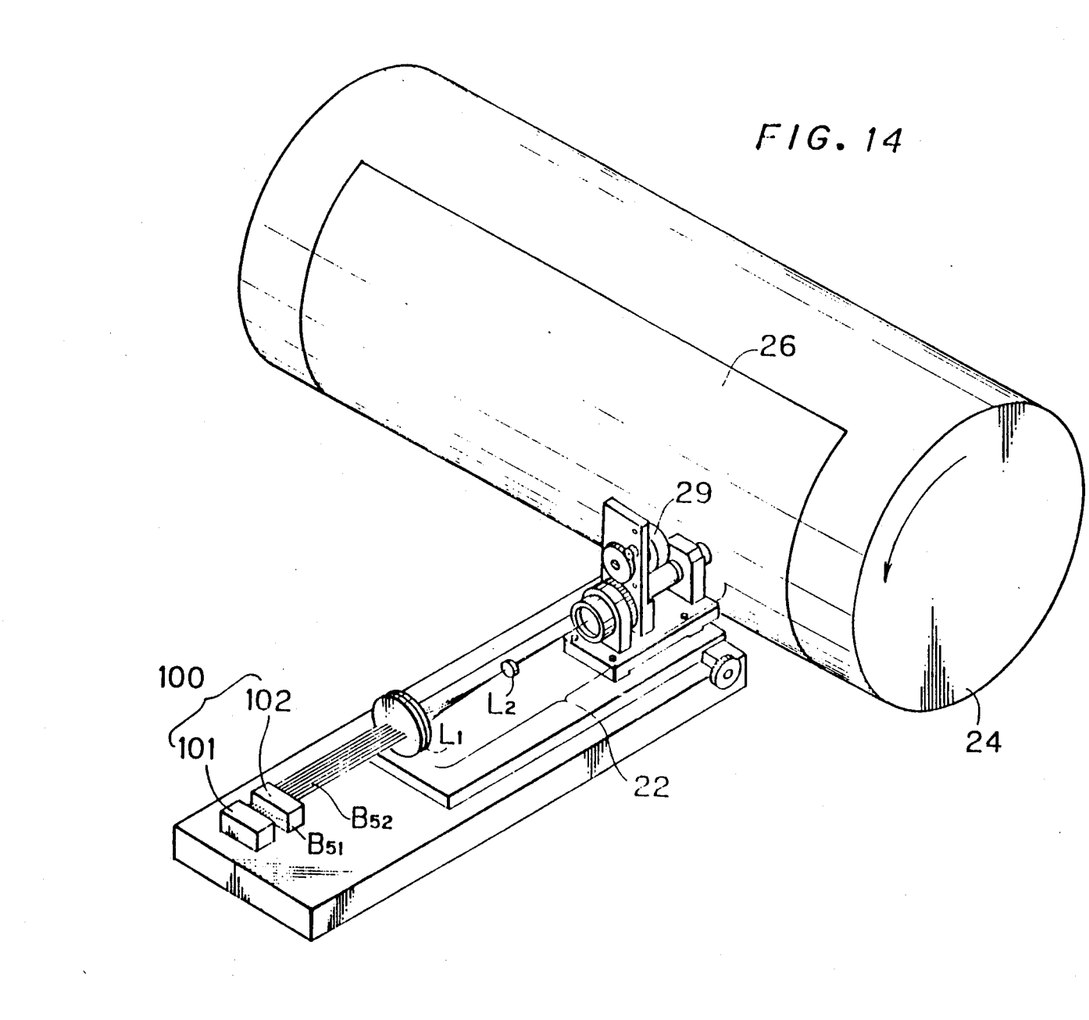
FIG. 14 is a perspective view of a recording head of an image recorder according to a second preferred embodiment of the present invention.

FIG. 14 is a perspective view showing a recording head of an image recorder according to a second preferred embodiment of the present invention. As shown in the figure, a light source unit 100 comprises a light source group 101 having a plurality of light sources (such as laser diodes) and a beam adjuster 102 for adjusting the shapes and beam waists of laser beams outgoing from the light source group 101. The light sources of the group 101 emit laser beams in response to signals from a control unit (not shown), whereby beams $B_{51}$ which correspond to the image to be recorded are projected onto the laser beam adjuster 102.

A multibeam $B_{52}$ from the beam adjuster 102 enters the optical system 22, which is structured as shown in FIG. 8. As in the first embodiment, the beams $B_{52}$ are reduced and then directed toward photosensitive material 26 to record an image thereon.

In an alternative embodiment, the multibeam $B_{51}$ enters the optical system 22 without passing through the beam adjuster 102.

Although the present invention has been described and illustrated in detail, it is clearly understood that the same is by way of illustration and example only and is not to be taken by way of illustration. The spirit and scope of the present invention should be limited only by the terms of the appended claims.

What is claimed is:

1. An apparatus for recording an image on a recording surface, comprising:
    a light source for generating a plurality of recording laser beams;
    a modulator for individually modulating said laser beams in response to image signals which are representative of an image; and
    an afocal optical system for directing said laser beams toward a recording surface such that chief rays of each of said laser beams are substantially perpendicular to said recording surface at said recording surface;
    wherein first beam waists of each of said laser beams coincide with a front focal plane of said afocal optical system; and wherein said recording surface is located at a rear focal plane of said afocal optical system.

2. An apparatus for recording an image on a recording surface, comprising:
   a light source for generating a plurality of recording laser beams;
   a modulator for individually modulating said laser beams in response to image signals which are representative of an image; and
   an afocal optical system for directing said laser beams toward a recording surface such that chief rays of each of said laser beams are substantially perpendicular to said recording surface at said recording surface;
   wherein first beam waists of each of said laser beams do not coincide with a front focal plane of said afocal optical system; and
   wherein said recording surface does not coincide with a rear focal plane of said afocal optical system; and wherein said afocal optical system satisfies the following relationship:

$$\Delta Z_R = m^2 \cdot \Delta Z_F$$

where $\Delta Z_R$ is the distance between said rear focal plane and said recording surface, $\Delta Z_F$ is the distance between said front focal plane and said first beam waists, and m is the magnification of said afocal optical system.

3. An apparatus for recording an image on a recording surface, comprising:
   a light source, including: (1) means for generating a source laser beam and (2) beam splitting means for splitting said source laser beam into a plurality of recording laser beams, each of said recording laser beams having a slightly different optical length;
   a modulator for individually modulating said recording laser beams in response to image signals which are representative of an image; and
   an afocal optical system for directing said recording laser beams toward a recording surface, such that chief rays of each of said recording laser beams are substantially perpendicular to said recording surface at said recording surface, said afocal optical system being a reduction lens system;
   wherein first beam waists of each of said recording laser beams do not coincide with a front focal plane of said afocal optical system; and
   wherein said recording surface is located at a rear focal plane of said afocal optical lens system; and
   wherein said afocal optical system satisfies the following relationship:

$$\Delta Z_R = m^2 \cdot \Delta Z_F$$

where $\Delta Z_R$ is the distance between said rear focal plane and said recording surface, $\Delta Z_F$ is the distance between said front focal plane and said first beam waists, and m is the magnification of said afocal optical system.

* * * * *